US008494743B1

(12) United States Patent
Albertson

(10) Patent No.: US 8,494,743 B1
(45) Date of Patent: Jul. 23, 2013

(54) MOTOR VEHICLE SPEED CONTROL SYSTEM

(76) Inventor: Robert V. Albertson, Alma, WI (US)

( * ) Notice: Subject to any disclaimer, the term of this patent is extended or adjusted under 35 U.S.C. 154(b) by 270 days.

(21) Appl. No.: 13/066,663

(22) Filed: Apr. 19, 2011

Related U.S. Application Data

(60) Provisional application No. 61/343,171, filed on Apr. 26, 2010.

(51) Int. Cl.
*G06F 7/70* (2006.01)

(52) U.S. Cl.
USPC .................. 701/70; 701/78; 701/79; 477/92; 477/187

(58) Field of Classification Search
USPC ................ 701/70, 79, 78, 83, 86, 93; 477/92, 477/94, 120, 187, 904, 906; 123/406.55, 123/198 D
See application file for complete search history.

(56) References Cited

U.S. PATENT DOCUMENTS 3,672,344 A 6/1972 Albertson
3,742,928 A 7/1973 Albertson
3,871,341 A 3/1975 Kalogerson et al.
4,955,255 A 9/1990 Yamaashi et al.
8,294,057 B2 * 10/2012 Yamazaki et al. ............ 218/140

* cited by examiner

*Primary Examiner* — Gertrude Arthur Jeanglaude
(74) *Attorney, Agent, or Firm* — Richard John Bartz

(57) ABSTRACT

A motor vehicle speed control system for attenuating sudden unintended acceleration and maintaining driver control of a motor vehicle has a brake switch connected in series with a vacuum switch and a relay. A foot pedal when depressed actuates the brake switch to provide electric power to the vacuum switch coupled to the intake manifold of the motor vehicle. Vacuum pressure in the intake manifold actuates the vacuum switch to close the electric circuit to the relay. Relay interposed in the electric ignition or fuel injector circuits is open when both brake and vacuum switch are closed thereby interrupting these circuits and reducing the power or terminating the operation of the motor vehicle's engine.

32 Claims, 8 Drawing Sheets

MOTOR VEHICLE SPEED CONTROL SYSTEM

CROSS REFERENCE-TO RELATED APPLICATION

This application claims the priority benefit of U.S. Provisional Patent Application Ser. No. 61/343,171 filed Apr. 26, 2010.

FIELD OF THE INVENTION

The invention relates to motor vehicle speed control systems applicable to unintended acceleration conditions of a motor vehicle. The invention comprises methods and apparatus controls to operably shut down internal combustion engines that run at uncontrolled RPMS.

BACKGROUND OF THE INVENTION

Motor vehicles with internal combustion engines have vehicle driver controls and brakes that function to regulate the vehicle's acceleration, deceleration and stopping. The driver controls have foot pedals, mechanical linkages and electronic systems that allow the driver to operate the motor vehicle. Malfunction of the driver controls can result in unexpected and sudden vehicle acceleration that the driver is unable to stop the vehicle using its brakes. Motor vehicle braking systems are not designed to brake against full engine power and will overheat and lose some, if not most, of their effectiveness. The motor vehicle is out of control of the driver during unexpected acceleration situations which can cause vehicle damage and personal injury.

Model A Ford motor vehicles have internal combustion engines equipped with carburetors having throttle valves that control the flow of air through the carburetors to the engines. When the throttle valves are fully open, the engines operate at full speed. Foot pedals connected with linkages to the throttle valves control the positions of the valves to regulate the flow of air into the carburetors and resulting speed of the engine. The linkages can dislodge from the throttle valves or become stuck thereby causing the throttle valves to move to wide open positions whereby the engines race at excess speeds. This results in an unintended acceleration of the motor vehicle. The ignition dash board switches must be turned off to stop the engines as the brakes on these motor vehicles are ineffective to stop the vehicle with the engines operating at full speed.

R. V. Albertson in U.S. Pat. Nos. 3,672,344 and 3,742,928 discloses internal combustion engines having manually operable throttle controls connected to carburetor gas flow control valves with linkages. Electric switches associated with the linkages ground the electrical ignition circuits of the engines when the linkages, such as throttle cables, stick in throttle open positions. When the ignition circuits are grounded, the engines cease to operate.

S. Yamashi in U.S. Pat. No. 4,955,255 discloses a control system for a motor vehicle that automatically cuts off the power of the engine when an abnormal condition in the power transmission system is detected. The vehicle has a brake switch for producing a brake signal when a brake pedal is depressed. A vacuum switch produces an acceleration signal when pressure in the air intake passage of the engine exceeds a predetermined value. An engine speed sensor produces an engine speed signal when the engine speed exceeds a predetermined speed. A transmission control responsive to the brake signal, acceleration signal and engine speed signal operates to shift the transmission to a neutral range.

Modern motor vehicles are controlled electronically to improve fuel economy, reduce pollution, improve driving safety and reduce manufacturing costs. The electronic controls are subjected to hot and cold temperatures, humidity, vibration, mechanical shock, electrical interference and corrosive pollutants that can cause the electronic controls to malfunction. Some of the malfunction controls may be benign whereas others can be dangerous and cause accidents and endanger human life.

Cruise control systems are used with motor vehicles to keep the vehicle's speed constant on long runs and help prevent driver fatigue. Software interlocks are included in cruise control systems to prevent the cruise control from operating in certain gears and below selected speeds. Safety switches deactivate the cruise control when the brakes are applied. The malfunction of the cruise control system of a motor vehicle can result in unintended sudden acceleration of the vehicle.

Electronic throttle controls were introduced in motor vehicles in 1988. With electronic throttle control, the driver no longer controls the throttle by means of linkages between the accelerator foot pedal and throttle. An electronic link from the foot pedal to the electronic throttle control works in conjunction with the electronic engine control unit to control the engine speed. The electronic systems are safely critical systems with potential to fail by causing the vehicle to suddenly accelerate.

SUMMARY OF THE INVENTION

The motor vehicle speed control system of the invention is an independent fail-safe control apparatus and method that operates entirely independently of the cruise control and electronic throttle controls of the motor vehicle and accelerator foot pedal and mechanical throttle linkages to control the operation of the vehicle's engine. The engine of the motor vehicle has a conventional brake system which includes a foot pedal, master cylinder and a brake switch. When the foot pedal is depressed to apply the brakes, the brake switch is activated to an ON condition providing a brake electric signal. The engine also includes fuel injectors, igniters and an air intake manifold which generates vacuum pressure during the operation of the engine. When the engine is operating at high or full speed, the vacuum pressures the intake manifold increases due to the restriction of air flow into and through the intake manifold. The motor speed control system uses the brake switch ON signal in cooperation with a vacuum switch coupled to the intake manifold to control a normally closed relay to terminate electric power to one or more or all of the igniters or fuel injectors to reduce the speed of the engine or shut off the engine. The relay is connected to the electric igniter circuit or fuel injector circuit that controls the sequence operation of the igniters or fuel injectors to fire or control the air fuel mixture in the engine's cylinders. The relay is normally closed to complete the electric igniter or fuel injector circuits. When brake and vacuum switches are closed, or ON, the electric circuit to relay is completed to activate the relay to its open or OFF condition. When relay is open or OFF, the electric igniter circuit is open thereby terminating the electric power to one or more or all the igniters or fuel injectors and shutting down the engine. Sudden inadvertent vehicle acceleration of the motor vehicle is controlled along with the vehicle's brakes when the brake pedal is depressed.

An alternative motor speed control system has a brake switch connected to the brake fluid line. The brake switch turns ON responsive to an increase of brake fluid pressure in the brake fluid line. The brake switch is connected in series with a vacuum switch and a relay. The vacuum switch operably connected to the intake manifold is turned ON in response to a selected vacuum pressure in the manifold. The relay is wired into the electric igniter circuit or electric fuel injector circuit to control the operations of the igniters, fuel injections or fuel pump. Under sudden inadvertent acceleration of the motor vehicle, the driver depresses the brake foot pedal to activate the brake switch to its ON position. The vacuum pressure in the intake manifold subjected to the vacuum switch turns the vacuum switch ON. This completes the electric circuit to the relay causing the relay to open and interrupt the electric circuits to one or more or all of the igniters or fuel injectors. The result is that the engine will automatically reduce power or shut off. The driver is then able to control the motor vehicle and compensate for sudden unintended vehicle acceleration.

DESCRIPTION OF THE INVENTION

Figure 1:
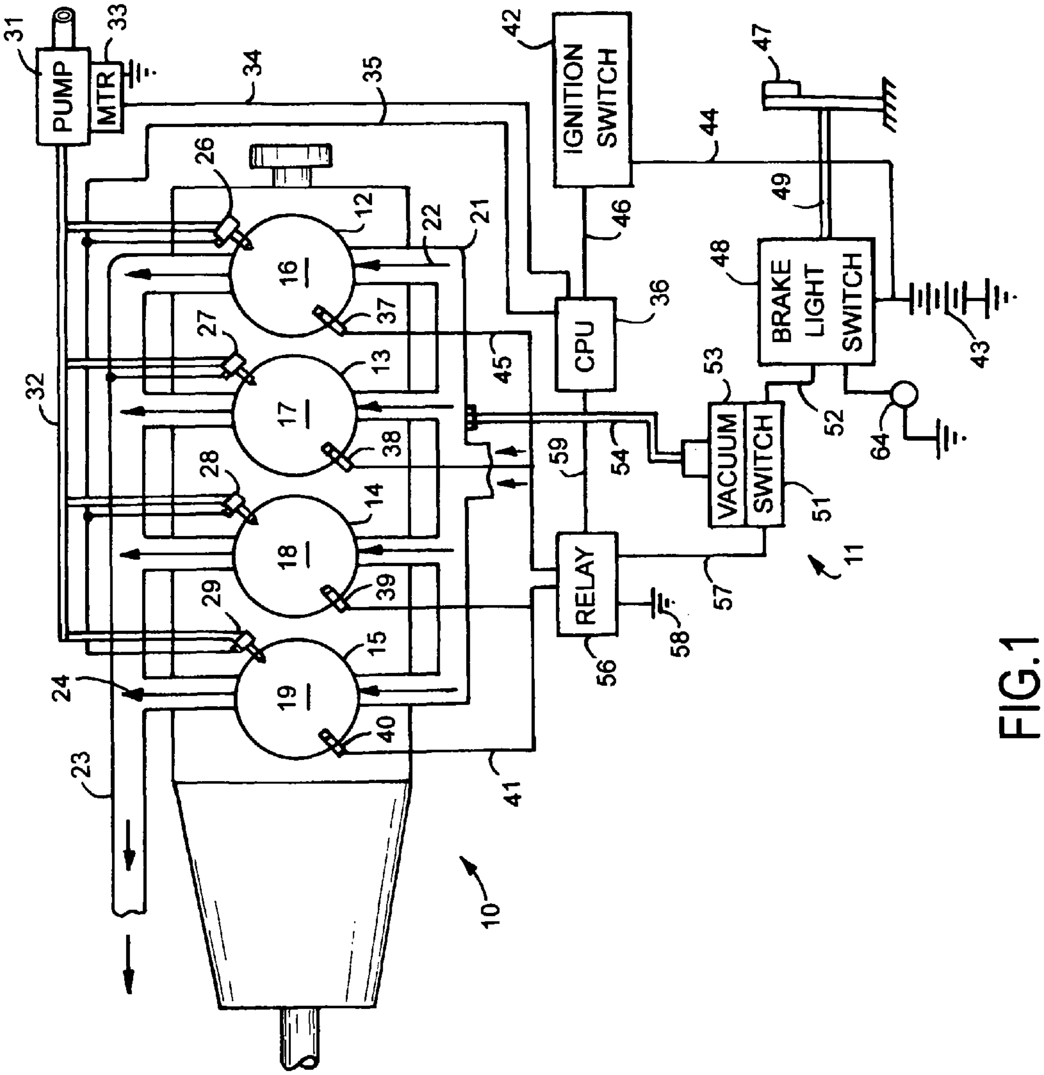
FIG. 1 is a diagrammatic view of a first embodiment of the motor vehicle speed control system of the invention.

A first embodiment of an internal combustion engine 10 equipped with an engine speed control system 11 of the invention is diagrammatically shown in FIG. 1. Internal combustion engine 10 is a conventional four-cylinder engine having cylinders 12, 13, 14 and 15 accommodating reciprocating pistons 16, 17, 18 and 19. Air flows into cylinders 12-15 through an air intake manifold 21 shown by arrows 22. The engine can have six, eight or more cylinders. Exhaust gases flow from cylinders 12-15 through an exhaust manifold 23 to a muffler and atmosphere shown by arrows 24. Engine 10 is equipped with direct fuel injectors 26, 27, 28 and 29 connected with tubes 32 to a fuel pump 31. An electric motor 33 operates fuel pump 31 to supply liquid fuel to injectors 26-29. The fuel injectors 26-29 can be located in the air intake manifold 21 as disclosed in U.S. Pat. No. 7,607,293. Motor 34 is wired with conductor 34 to the vehicle electronic control unit or CPU 36. A number of conductors 35 electrically connect CPU 36 with the electronic controls of fuel injectors 26-29 whereby the CPU 36 sequentially operates the injectors 26-29 in timed relation with the combustion cycles of pistons 16-19. Igniters or spark plugs 37, 38, 39 and 40 associated with cylinders 12-15 are operable to generate electric arcs that ignite the air fuel mixture in cylinders 12-15 in time relation with the compression strokes of pistons 16-19. Electric conductors 41 wire igniters 37-40 to CPU 36 whereby the program and electronic components of CPU 36 sequentially control the operation of igniters 37-40 during operation of engine 10.

The electric controls for engine 10 includes a conventional ignition switch 42 wired to an electric power source or battery 43 with an electric cable 44. A conductor 46 connects switch 42 to CPU 36 to supply electric power to the CPU. A motor vehicle has a conventional foot brake pedal 48 located adjacent an accelerator or gas pedal (not shown) connected with a linkage 49 to a brake light-switch 48. Brake light switch 48 wired to the vehicle's brake lights 64 is normally open whereby the brake lights are off. When a vehicle operator presses on brake pedal 47, brake light switch is actuated to an ON condition which turns brake lights 64 on providing a brake signal.

The vehicle speed control system 11 of the invention uses the ON-OFF conditions of brake light switch 48 in conjunction with a vacuum switch 51 and a third switch or relay 56 to cut off the operation of igniters 37-40 during unintended acceleration of engine 10. The engine 10 will stop operating when igniters 37-40 are not functioning. The vehicle operator remains in control of the vehicle with engine 10 shut off. Brake light switch 48 is wired in series with cable 52 to vacuum switch 53 which is normally open. A vacuum tube or hose 54 connects vacuum switch 53 to air intake manifold 21. Vacuum switch 53 has an internal chamber accommodating a diaphragm operably connected to a micro switch that turns switch 53 on and off. An adjustable member associated with a biasing member operates to adjust the amount of vacuum pressure required to turn switch 53 on. An example of a vacuum switch is a PSF 1095 switch marketed by World Magnetics Company, traverse City, Mich. A conductor 57 wires vacuum switch 53 to relay 56 connected to ground 58. Relay 56 is normally closed switch to electrically connect CPU to igniters 37-40.

In use, when the operating speed of engine 10 is out of control, such as an unintended acceleration of the motor vehicle, the vacuum pressure or negative pressure of air in air intake manifold 21 increases due to the limited capacity of the engine to move air into cylinders 12-15 when the engine is running at extreme RPMS. The vehicle operator to maintain control of the vehicle will apply the vehicle's brakes by depressing foot pedal 47. The brake system of the vehicle is actuated along with brake light switch 48 turning switch 48 on. The high vacuum pressure in manifold 21 subjected to vacuum switch 53 turns switch on. Vacuum switch 53 is adjustable to regulate the amount of vacuum pressure needed to turn switch 53 on. When both switches 48 and 53 are ON, relay 56 is actuated to an off condition thereby interrupting the electric circuit from CPU to igniters 37-40. This causes engine 10 to stall and function as an engine brake for the vehicle. The vehicle operator maintains driving control of the vehicle which will stop in a reasonably short period of time and distance. The operator can turn off the ignition switch 42 and release foot pedal 47 when the vehicle is stopped.

Figure 2:
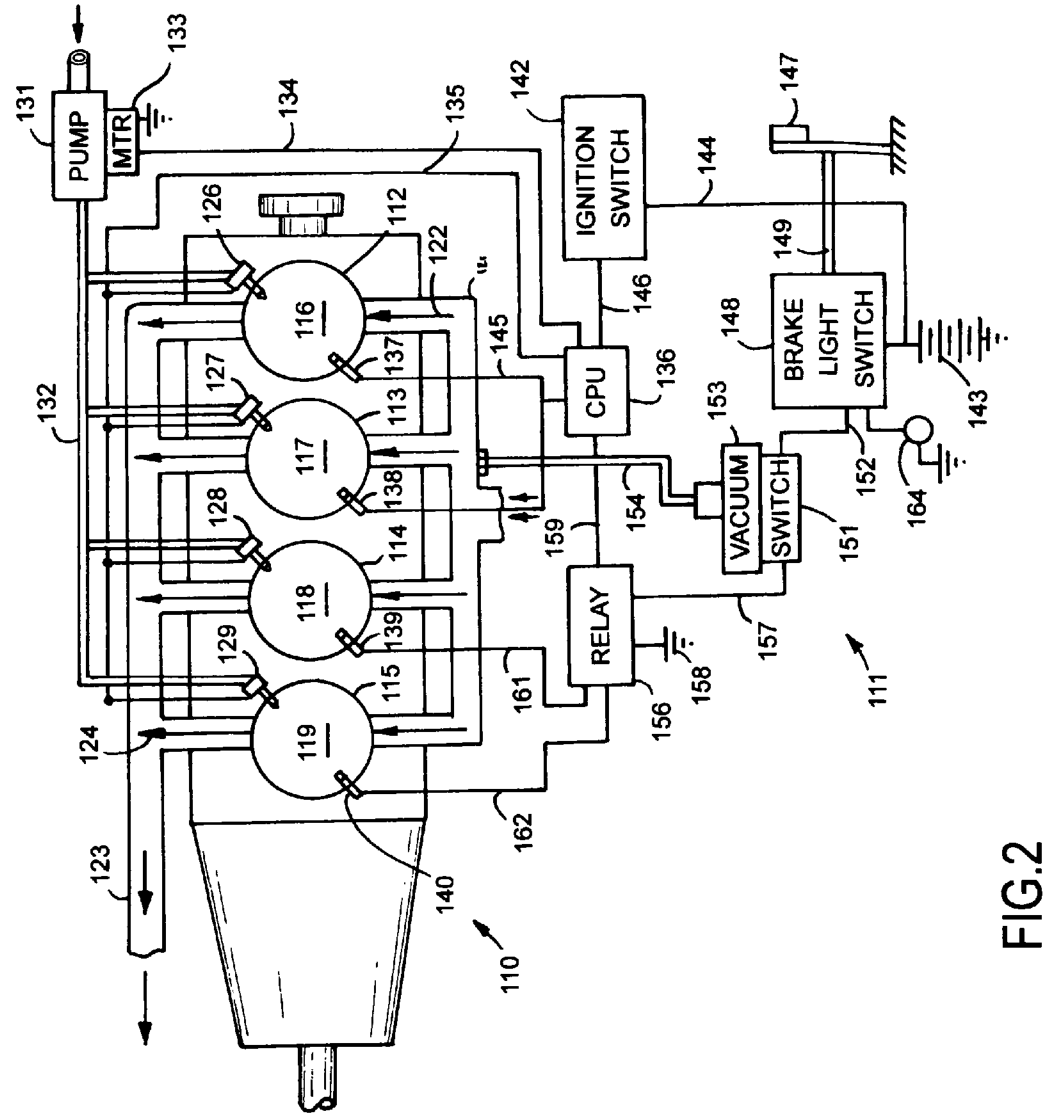
FIG. 2 is a diagrammatic view of a second embodiment of the motor vehicle speed control system of the invention.

The second embodiment of speed control system 111 shown in FIG. 2 is used with internal combustion engine 110 of a motor vehicle. The components of engine 110 that correspond to engine 10 have the same reference numbers with the prefix 1. Engine 10 is incorporated herein by reference.

CPU 136 is wired with conductors 145 to fuel injectors 137 and 138. The speed control system 111 includes the brake light switch 148 wired in series with cable 152 to vacuum switch 153. Relay 156 is connected with cable 157 to vacuum switch 153 and ground 158. Separate conductors 161 and 162 electronically connect relay 156 to fuel injectors 139 and 140.

In use, when engine 110 runs at unintended speed, such as during unintended vehicle acceleration, the vehicle speed control system 111 uses the brake light switch 148 actuated by foot pedal 147 by the vehicle's operator in conjunction with vacuum switch 153 and relay 156 to terminate operation of igniters 139 and 140 thereby eliminating combustion of fuel in cylinders 114 and 115. The pistons 118 and 119 in cylinders 114 and 115 then function as motor brakes. Pistons 116 and 117 in cylinders 112 and 113 continue to operate engine 110 at a slower speed. When foot pedal 147 is depressed by the vehicle's operator, brake light switch is turned ON. The high vacuum pressure subjected to vacuum switch 153 turns vacuum switch ON. Electric power is supplied to relay 156 which opens relay 156. The open relay 156 terminates the electric power to fuel injectors 139 and 140. This terminates the power generation of cylinders 144 and 115. The engine 110 continues to run with cylinders 116 and 117. In alternative embodiments, relay 156 can be wired to only one fuel injector or a plurality of fuel injectors of an internal combustion engine to turn off the operations of the fuel injectors.

Figure 3:
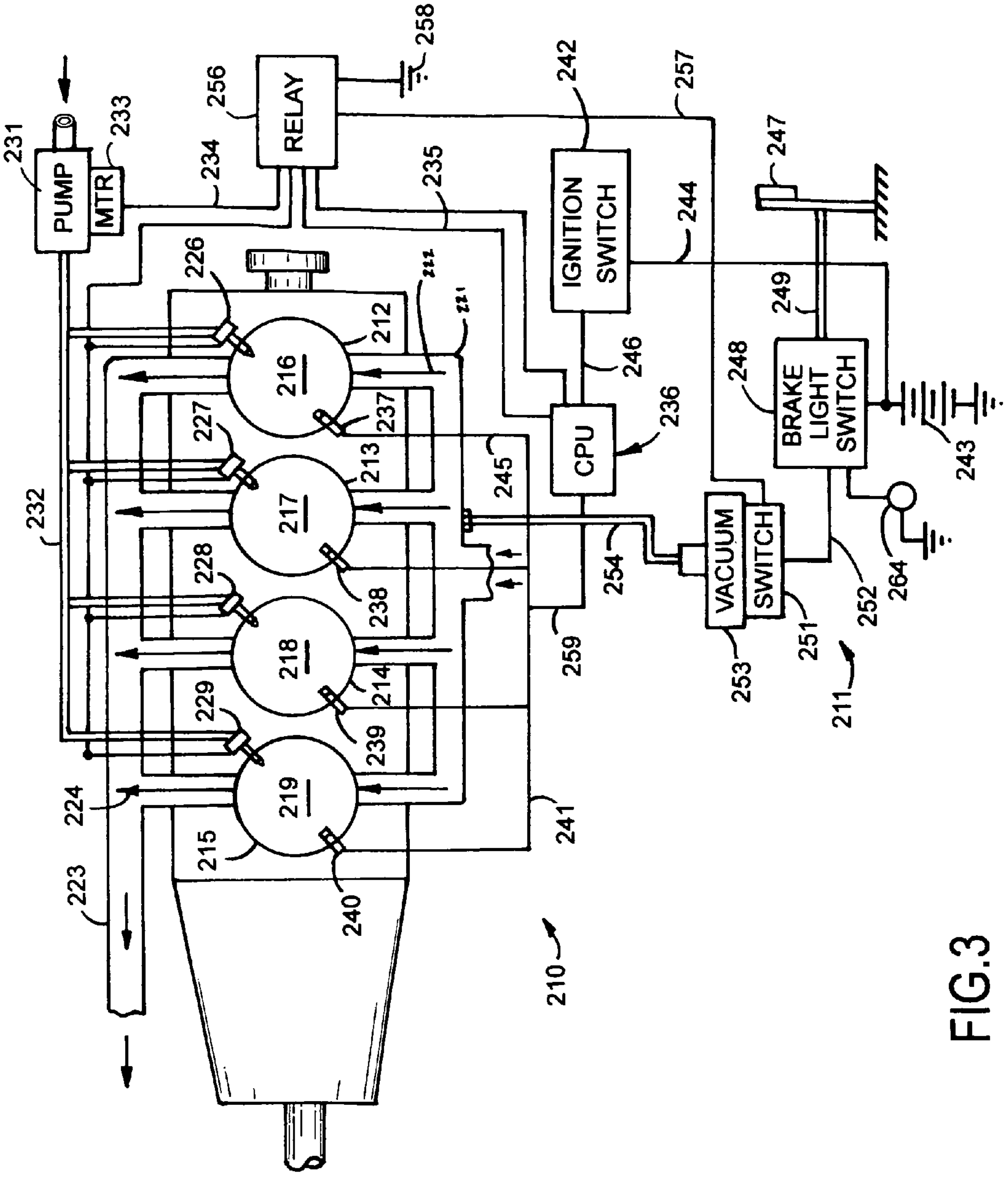
FIG. 3 is a diagrammatic view of a third embodiment of the motor vehicle speed control system of the invention.

The third embodiment of speed control system 211 shown in FIG. 3 is used with an internal combustion engine 210 that corresponds to engine 10. The components of engine 210 that correspond with engine 10 have the same reference numbers with the prefix 2. Engine 10 is incorporated herein by reference.

CPU 236 is wired to igniters 237, 238, 239 and 240 with conductors 241, 245 and 259 to continuously operate igniters to burn fuel in cylinders 212-215. The speed control system 211 has relay 256 interposed in conductors 234 and 235 connecting CPU 236 with fuel pump motor 233 and fuel injectors 226-229. Cable 257 joins vacuum switch 253 to relay 256.

In use, when engine 210 runs at unintended speed, such as during unintended vehicle acceleration, the vehicle speed control system 211 uses the brake light switch 248 actuated by foot pedal 247 by the vehicle's operator in conjunction with vacuum switch 253 and relay 256 to terminate the introduction of fuel into cylinders 212-215 and operation of fuel pump 231. The fuel remaining in cylinders 212-215 will burn and be replaced with air from the intake manifold 221. Minimum pollutants are discharged into the environment. Pistons 216-219 in cylinders 212-215 continue to pump air whereby engine 210 functions as a motor brake along with the conventional brakes to stop the vehicle. When the vehicle is stopped, the ignition switch 242 can be turned off. When the foot pedal 247 is released, the brake light switch 248 is off. Also, the nonoperating engine does not generate a manifold vacuum pressure that actuates vacuum switch 253. With switches 248 and 253 open, relay 256 will close thereby electrically connecting CPU 236, fuel pump motor 233 and fuel injectors 226-229.

Figure 4:
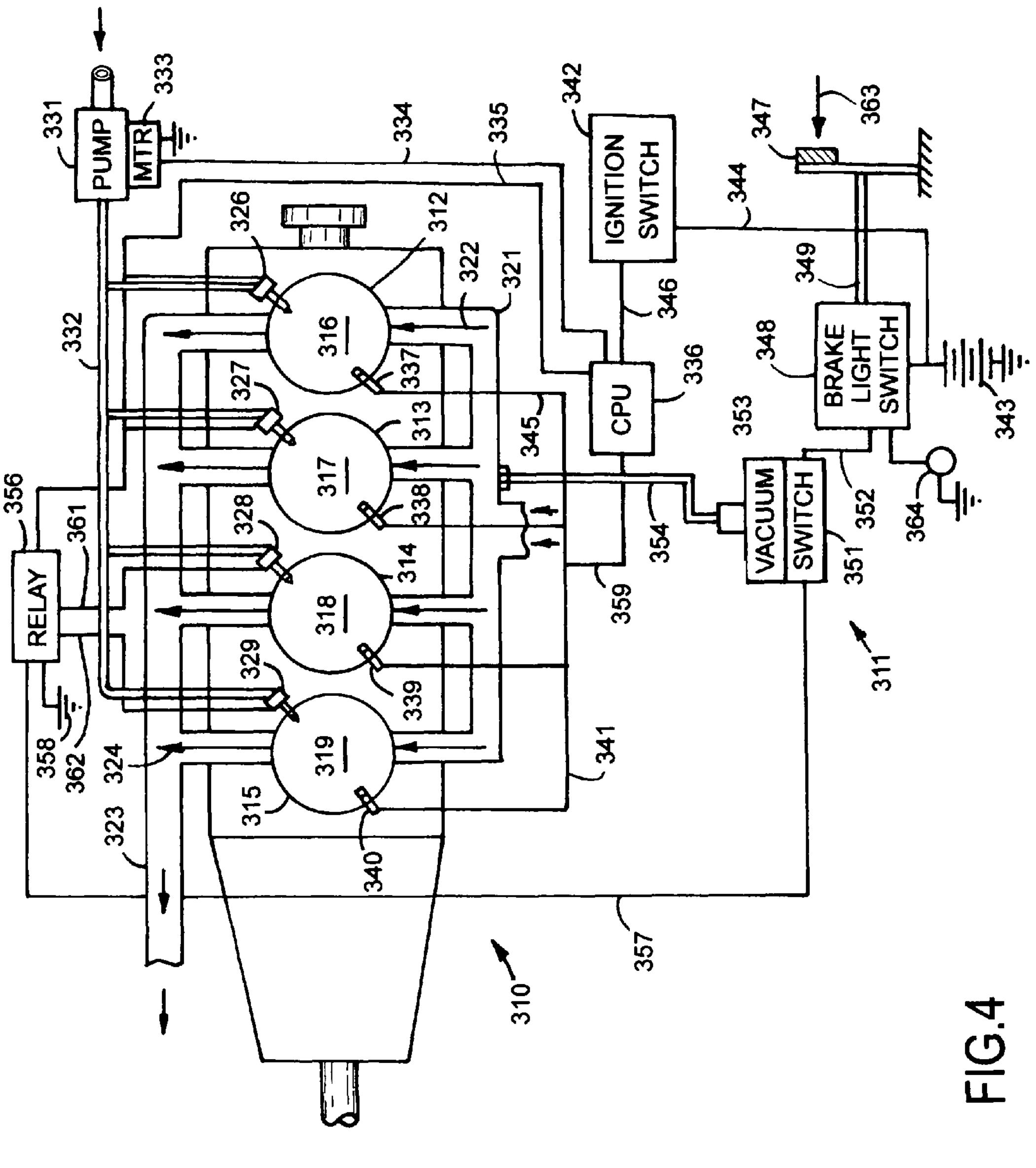
FIG. 4 is a diagrammatic view of a fourth embodiment of the motor vehicle speed control system of the invention.

The fourth embodiment of speed control system 311 shown in FIG. 4 is associated with internal combustion engine 310. The components of engine 310 that correspond with engine 10 have the same reference numbers with the prefix 3. Engine 10 is incorporated herein by reference.

CPU 336 is wired to ignition switch to connect CPU 336 with electric power source 343. Conductors 334 and 335 connect CPU 336 to fuel pump motor 333 and the electronics of fuel injectors 326-329. CPU 336 also controls the operation of igniters 337-340 that sequentially ignite the air fuel mixture in cylinders 312-315. Speed control system 311 includes the normally open brake light switch 348 wired to vacuum switch 353. A tube or hose 354 connects vacuum switch 353 to intake manifold 321 whereby high vacuum pressure actuates switch 353. Switch 353 is wired to relay 356 with conductor 357. Relay 356 is only wired with conductors 361 and 362 to fuel injectors 328 and 329. Fuel injectors 326 and 327 are not operably connected to relay 356. In the event of uncontrolled excessive speed of engine 310, the vehicle operator can apply the vehicle's brake with foot pedal 347 shown by arrow 363. The brake light switch will turn on providing electric power to brake lights 364. The vacuum pressure from manifold 321 applied to vacuum switch 353 turns switch 353 ON. When switches 348 and 353 are both ON relay 356 is activated to an open or OFF position terminating operation of fuel injectors 328 and 329. Igniters 339 and 340 continue to operate so that fuel in cylinders will burn. Air introduced in cylinders 318 and 319 function as a motor brake as it is compressed by the moving pistons 318 and 319. Engine 310 will continue to operate with cylinders 316 and 317. When brake pedal 347 is released, the light switch 348 is OFF. The electric circuit to relay 356 is open causing relay to close to connect fuel injectors 328 and 329 to CPU 336. The engine 310 will again operate on all of its cylinders.

Figure 5:
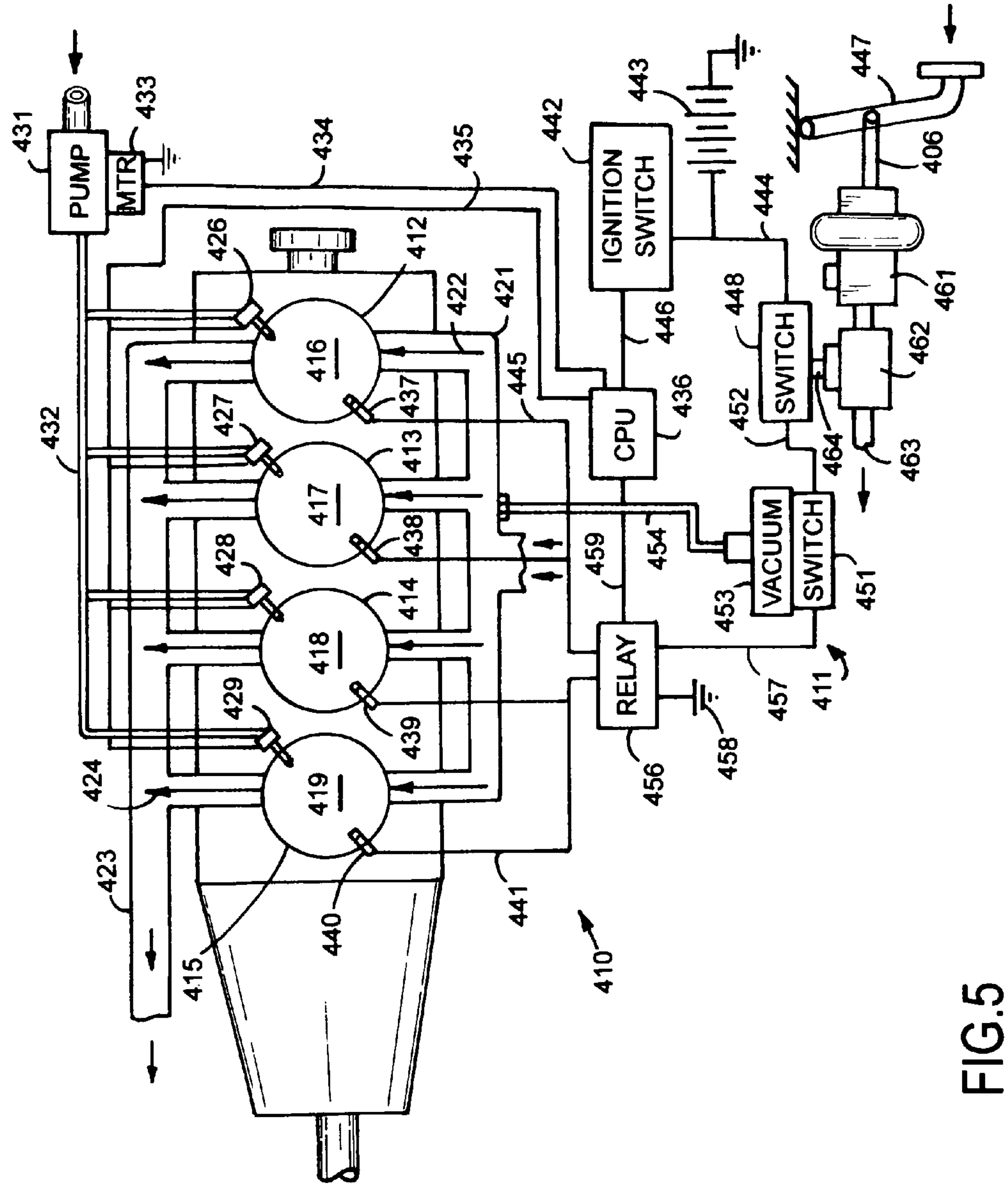
FIG. 5 is a diagrammatic view of a fifth embodiment of the motor vehicle speed control system of the invention.

A fifth embodiment of an internal combustion engine 410 equipped with an engine speed control system 411 of the invention is diagrammatically shown in FIG. 5. Internal combustion engine 410 is a conventional four-cylinder engine having cylinders 412, 413, 414 and 415 accommodating reciprocating pistons 416, 417, 418 and 419. Air flows into cylinders 412-415 through an air intake manifold 421 shown by arrows 422. The engine can have six, eight or more cylinders. Exhaust gases flow from cylinders 412-415 through an exhaust manifold 423 to atmosphere shown by arrows 424. Engine 410 is equipped with direct fuel injectors 426, 427, 428 and 429 connected with tubes 432 to a fuel pump 431. An electric motor 433 operates fuel pump 431 to supply liquid fuel to injectors 426-429. The fuel injectors 426-429 can be located in the air intake manifold 421 as disclosed in U.S. Pat. No. 7,607,293. Motor 434 is wired with conductor 434 to the vehicle electronic control unit or CPU 436. A number of conductors 435 electrically connect CPU 436 with the electronic controls of fuel injectors 426-429 whereby the CPU 436 sequentially operates the injectors 426-429 in timed relation with the combustion cycles of pistons 416-419. Igniters or spark plugs 437, 438, 439 and 440 associated with cylinders 412-415 are operable to generate electric arcs that ignite the air fuel mixture in cylinders 412-415 in time relation with the compression strokes of pistons 416-419. Electric conductors 441 wire igniters 437-440 to CPU 436 whereby the electronic components of CPU 436 sequentially control the operation of igniters 437-440 during operation of engine 410.

A motor vehicle having engine 410 has conventional vehicle brake systems manually operated with a foot pedal 447. A linkage 406 connects foot pedal 447 with a brake master cylinder 461 connected to a brake fluid line 463 leading to the brake actuation cylinders. A T-coupling 462 interposed in line 463 diverts brake fluid under pressure to a normally open or OFF switch 448. A conductor 444 wires switch 448 to an electric power source 443, shown as a battery.

The vehicle speed control system 411 of the invention uses the ON-OFF conditions of switch 448 in conjunction with a vacuum switch 453 and a relay 456 to terminate the operation of engine 410 or reduce the operation of engine 410. Vacuum switch 452 is normally OPEN or OFF. A tube or hose 454 connects vacuum switch 453 to the intake manifold 421 of engine 410 whereby the vacuum pressure of a selected pressure actuates switch 453 to an ON position to electrically connect switch 453 to relay 456. Relay 456 is normally closed or ON to connect CPU 436 to igniters 437-440. When relay

456 is open or OFF, the electric power to igniters 437-440 is terminated whereby engine ceases to generate power. Engine 410 functions as a jack brake or motor brake along with the conventional brakes of the motor vehicle. Switch 448 and vacuum switch 453 are wired in series with cable 452 whereby both switches 448 and 453 must be closed to energize relay 456 to shut down engine 410 during unintended acceleration of the engine.

In use, when the operating speed of engine 410 is out of control, such as an unintended acceleration of a motor vehicle, the vacuum pressure of air in intake manifold 421 increases due to excessive speed of operation of engine 510 and the limited capacity of the engine to move air into cylinders 412-415. The vehicle operator to maintain control of the vehicle will apply the vehicle's brakes by depressing foot pedal 447. The brake system of the vehicle is actuated along with switch 448 turning switch 448 ON. The high vacuum pressure in manifold 421 subjected to vacuum switch 453 turns switch ON. When both switches 448 and 453 are ON, relay 456 is actuated to an OFF condition thereby interrupting the electric circuit from CPU to igniters 437-440. This causes engine 410 to stall and function as an engine brake for the vehicle. The vehicle operator maintains driving control of the vehicle which will stop in a reasonably short period of time and distance. The operator can turn off the ignition switch 442 and release foot pedal 447 when the vehicle is stopped.

Figure 6:
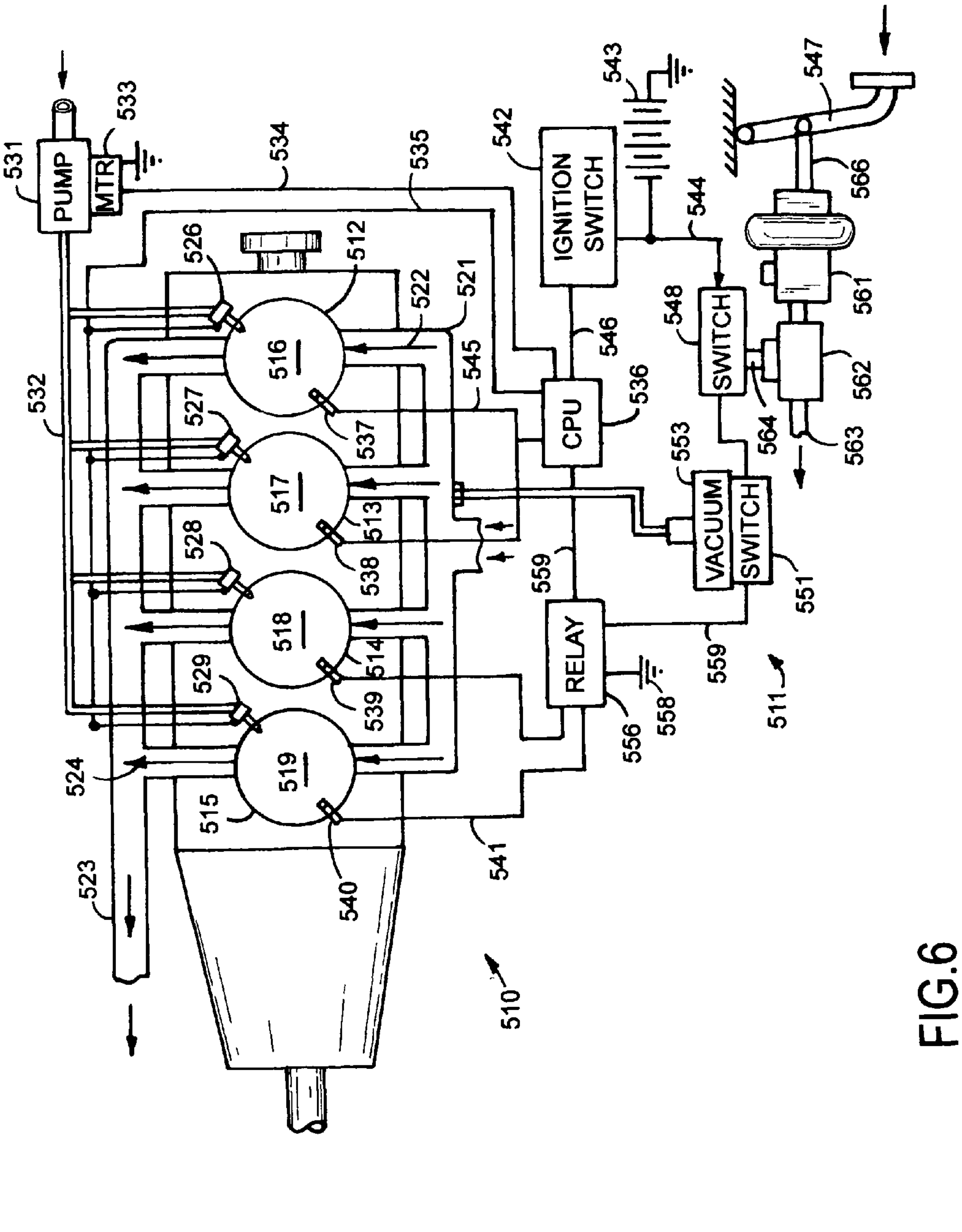
FIG. 6 is a diagrammatic view of a sixth embodiment of the motor vehicle speed control system of the invention.

The sixth embodiment of speed control system 511 shown in FIG. 6 is used with internal combustion engine 510 of a motor vehicle. The components of engine 510 that correspond to engine 410 have the same reference numbers with the prefix 5. Engine 410 is incorporated herein by reference.

CPU 536 is wired with conductors 545 to fuel injectors 537 and 538. The speed control system 511 includes a brake switch 548 wired in series with cable 552 to vacuum switch 543. Relay 556 is connected with cable 557 to vacuum switch 553 and ground 558. A separate conductors 541 electronically connects relay 556 to fuel injectors 538 and 540.

In use, when motor 510 runs at unintended speed, such as during unintended vehicle acceleration, the vehicle speed control system 511 uses the brake switch 548 activated by foot pedal 547 by the vehicle's operator in conjunction with vacuum switch 553 and relay 556 to terminate operation of igniters 539 and 540 thereby eliminating combustion of fuel in cylinders 514 and 515. The pistons 518 and 519 in cylinders 514 and 515 then function as motor brakes. Pistons 516 and 517 in cylinders 512 and 513 continue to operate engine 510 at a slower speed. When foot pedal 547 is depressed by the vehicle's operator, brake switch is turned ON. The vacuum pressure subjected to vacuum switch 553 turns vacuum switch 553 ON. Electric power is supplied to relay 556 which opens relay 556. The open relay 556 terminates the electric power to fuel injectors 539 and 540. This terminates the power generation of cylinders 514 and 515. The engine 510 continues to run with cylinders 516 and 517. In alternative embodiments, relay 556 can be wired to only one fuel injector or a plurality of fuel injectors of an internal combustion engine to turn off the operations of the fuel injectors.

Figure 7:
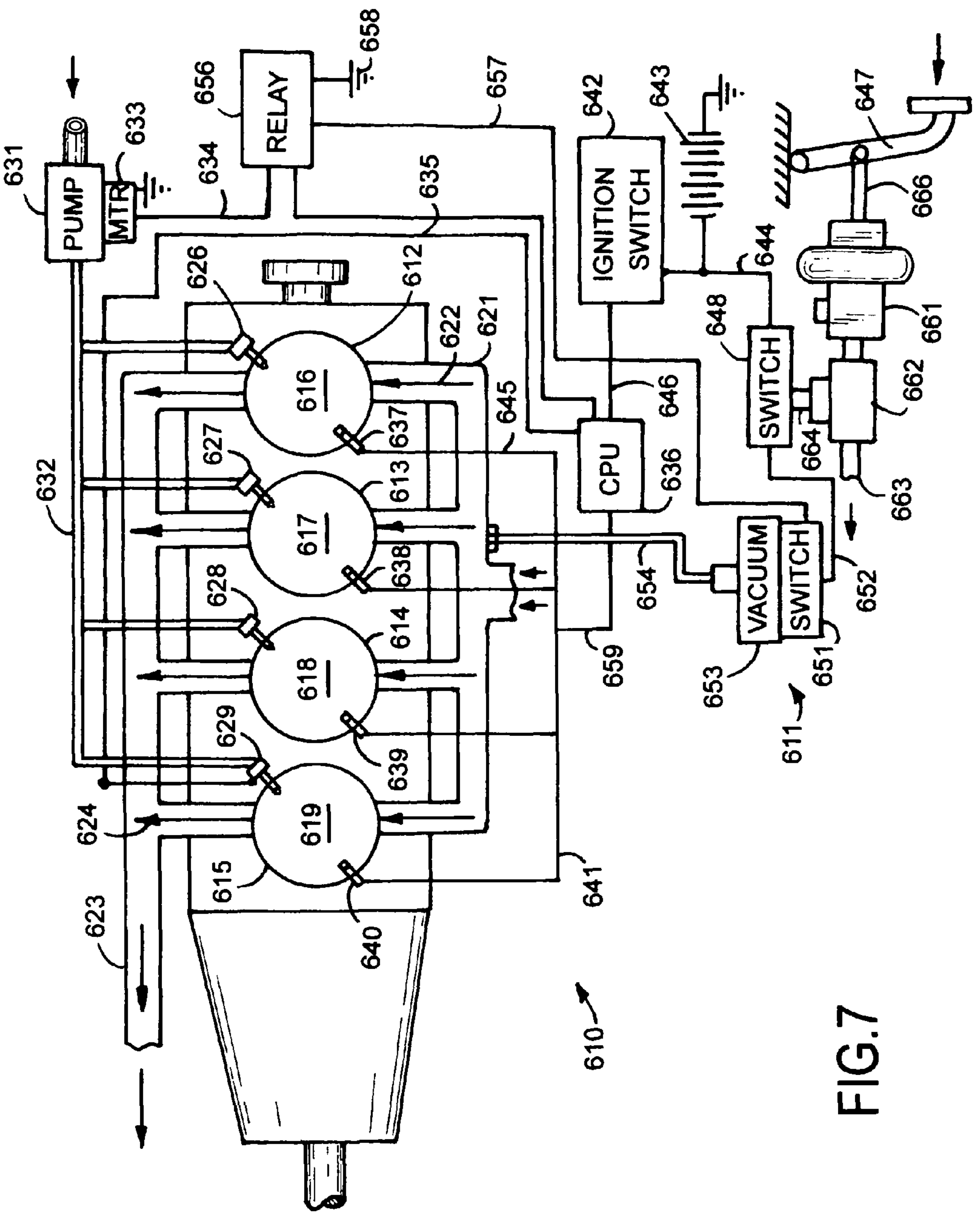
FIG. 7 is a diagrammatic view of a seventh embodiment of the motor vehicle speed control system of the invention.

The seventh embodiment of speed control system 611 shown in FIG. 7 is used with an internal combustion engine 710 that corresponds to engine 10. The components of engine 710 that correspond with engine 10 have the same reference numbers with the prefix 6. Engine 10 is incorporated herein by reference.

CPU 636 is wired to igniters 637, 638, 639 and 640 with conductors 641, 645 and 659 to continuously operate igniters 637-640 to burn fuel in cylinders 612-615. The speed control system 611 has relay 656 interposed in a conductor 634 connecting CPU 636 with fuel pump motor 633. Fuel injectors 626-629 are wired with conductor 635 to CPU 636. Cable 657 joins vacuum switch 653 to relay 656.

In use, when engine 610 runs at unintended speed, such as during unintended vehicle acceleration, the vehicle speed control system 611 uses the brake switch 648 activated by foot pedal 647 by the vehicle's operator in conjunction with vacuum switch 653 and relay 656 to terminate the supply of fuel into cylinders 612-615. The operation of fuel pump 631 is stopped. The fuel remaining in cylinders 612-615 will burn and be replaced with air from the intake manifold 621. Minimum pollutants are discharged into the environment. Pistons 616-619 in cylinders 612-615 continue to pump air whereby engine 610 functions as a motor brake along with the conventional brakes to stop the vehicle. When the vehicle is stopped, the ignition switch 642 can be turned off. When the foot pedal 647 is released, the brake switch is off. Also, the nonoperating engine does not generate a manifold vacuum pressure that actuates vacuum switch 653. With switches 648 and 653 open relay 656 will close thereby electrically connecting CPU 636, fuel pump motor 633 and fuel injectors 626-629.

Figure 8:
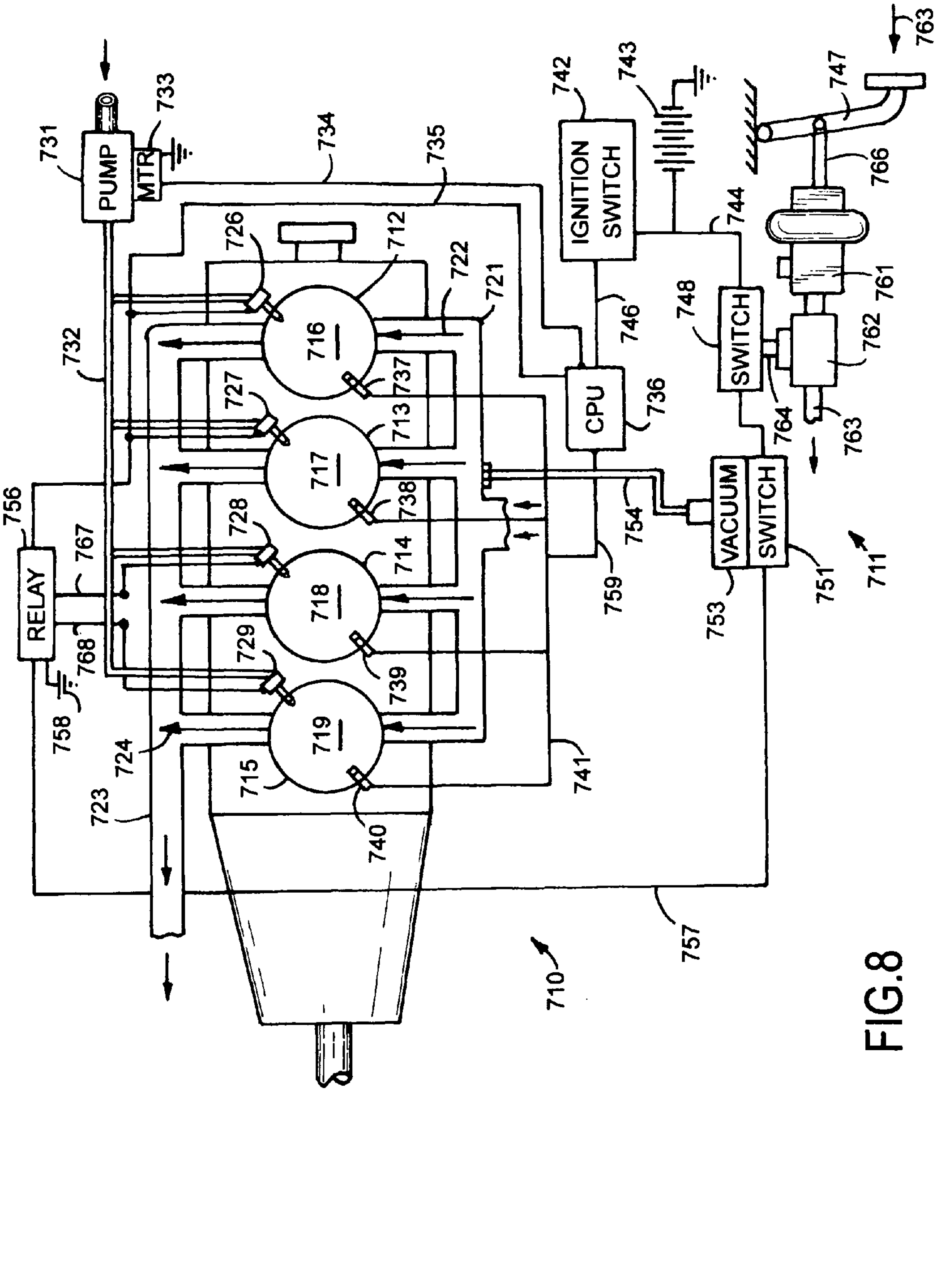
FIG. 8 is a diagrammatic view of an eighth embodiment of the motor vehicle speed control system of the invention.

The eighth embodiment of speed control system 711 shown in FIG. 8 is associated with internal combustion engine 710. The components of engine 710 that correspond with engine 10 have the same reference numbers with the prefix 7. Engine 10 is incorporated herein by reference.

CPU 736 is wired to ignition switch 742 to connect CPU 736 with electric power source 743. A conductor 734 connects CPU 736 to fuel pump motor 733. The electronics of fuel injectors 726-729 are wired to CPU 736 with conductor 735. CPU 736 also controls the operation of igniters 737-740 that sequentially ignite the air fuel mixture in cylinders 712-715. Speed control system 711 includes the normally open brake switch 748 wired to vacuum switch 753. A tube or hose 754 connects vacuum switch 753 to intake manifold 721 whereby high vacuum pressure actuates switch 753. Switch 753 is wired to relay 756 with a conductor 757. Relay 756 is only wired with conductors 761 and 762 to fuel injectors 728 and 729. Fuel injectors 726 and 727 are not operably connected to relay 756. In the event of uncontrolled excessive speed of engine 710, the vehicle operator can apply the vehicle's brake with foot pedal 747 shown by arrow 763. The brake switch 748 will turn on providing electric power to vacuum switch 753. The vacuum pressure from manifold 721 applied to vacuum switch 753 turns switch 753 ON. When switches 748 and 753 are both ON relay 756 is activated to an open or OFF position terminating operation of fuel injectors 728 and 729. Igniters 739 and 740 continue to operate so that fuel in cylinders will burn. Air introduced in cylinders 718 and 719 function as a motor brake as it is compressed by the moving pistons 718 and 719. Engine 710 will continue to operate with cylinders 716 and 717. When brake pedal 747 is released, the light switch 748 is OFF. The electric circuit to relay 756 is open causing relay to close to connect fuel injectors 728 and 729 to CPU 736. The engine 710 will again operate on all of its cylinders.

The invention of the motor vehicle speed control system has been described with reference to preferred embodiments thereof. Changes, modifications and arrangement of structure scan be made by persons skilled in the art without departing from the invention.

The invention claimed is:

1. A speed control system for a motor vehicle having an internal combustion engine with air intake manifold, igniters, fuel injectors, electronic controls for regulating the operations of the igniters and fuel injectors, and a brake pedal for applying the vehicle's brakes comprising:

a brake switch for producing an electric first signal when the brake pedal is depressed, a vacuum switch operably connected to the air intake manifold of the vehicle for producing an electric second signal when vacuum pressure in the intake manifold exceeds a predetermined vacuum pressure, a first electric conductor electrically connecting the brake switch to the vacuum switch to transfer the first signal to the vacuum switch, a normally closed relay operably electrically connected to the electronic controls of the engine and the electric igniter circuit whereby the electronic controls of the engine regulates the operation of the igniters, and a second electric conductor electrically connecting the vacuum switch to the relay to transfer the second signal to the relay to actuate the relay to an open position thereby opening the electric igniter circuit terminating electric power to the igniters and shutting down the internal combustion engine.

2. The speed control system of claim 1 wherein:

the brake switch is a brake light switch for producing the first electric signal.

3. The speed control system of claim 1 wherein:

the brake switch is a brake fluid pressure operated switch for producing the first electric signal.

4. The speed control system of claim 1 including:

a tubular member connecting the vacuum switch to the air intake manifold to subject to the vacuum switch to the vacuum pressure in the air intake manifold.

5. The speed control system of claim 1 including:

a third electric conductor connecting the relay to one or more igniters whereby when the relay is open the electric igniter circuit to the one or more igniters is open and the electric power to the one or more igniters is terminated.

6. The speed control system of claim 1 including:

a third electric conductor connecting the relay to two of the igniters whereby when the relay is open the electric igniter circuit to the two igniters is open and the electric power to the two igniters is terminated.

7. A speed control system for a motor vehicle having an internal combustion engine with air intake manifold, igniters, fuel injectors, electronic controls for regulating the operations of the igniters and fuel injectors, and a brake pedal for applying the vehicle's brakes comprising:

a brake switch for producing an electric first signal when the brake pedal is depressed, a vacuum-switch operably connected to the air intake manifold of the vehicle for producing an electric second signal when vacuum pressure in the intake manifold exceeds a predetermined vacuum pressure, a first electric conductor electrically connecting the brake switch to the vacuum switch to transfer the first signal to the vacuum switch, a normally closed relay operably electrically connected to the electric fuel injector circuit whereby the electronic controls of the engine regulates the operation of the fuel injectors, and a second electric conductor electrically connecting the vacuum switch to the relay to transfer the second signal to the relay to actuate the relay to an open position thereby opening the electric fuel injector circuit terminating electric power to the fuel injectors and shutting down the internal combustion engine.

8. The speed control system of claim 7 wherein:

the brake switch is a brake light switch for producing the first electric signal.

9. The speed control system of claim 7 wherein:

the brake switch is a brake fluid pressure operated switch for producing the first electric signal.

10. The speed control system of claim 7 including:

a tubular member connecting the vacuum switch to the air intake manifold to subject to the vacuum switch to the vacuum pressure in the air intake manifold.

11. The speed control system of claim 7 including:

a third electric conductor connecting the relay to one or more fuel injectors whereby when the relay is open the electric fuel injector circuit to the one or more fuel injectors is open and the electric power to the one or more fuel injectors is terminated.

12. The speed control system of claim 7 including:

a third electric conductor connecting the relay to two of the fuel injectors whereby when the relay is open the electric fuel injectors circuit to the two fuel injectors is open and the electric power to the two fuel injectors is terminated.

13. A speed control system for a motor vehicle having an internal combustion engine with air intake manifold, igniters, a fuel pump, fuel injectors, electronic controls for regulating the operations of the igniters, fuel pump and fuel injectors, and a brake pedal for applying the vehicle's brakes comprising:

a brake switch for producing an electric first signal when the brake pedal is depressed, a vacuum switch operably connected to the air intake manifold of the vehicle for producing an electric second signal when vacuum pressure in the intake manifold exceeds a predetermined vacuum pressure, a first electric conductor electrically connecting the brake switch to the vacuum switch to transfer the first signal to the vacuum switch, a normally closed relay operably electrically connected to the electronic controls of the engine and the electric fuel pump circuit whereby the electronic controls of the engine regulates the operation of the fuel pump, and a second electric conductor electrically connecting the vacuum switch to the relay to transfer the second signal to the relay to actuate the relay to an open position thereby opening the electric fuel pump circuit terminating electric power to the fuel pump and shutting down the internal combustion engine.

14. The speed control system of claim 13 wherein:

the brake switch is a brake light switch for producing the first electric signal.

15. The speed control system of claim 13 wherein:

the brake switch is a brake fluid pressure operated switch for producing the first electric signal.

16. The speed control system of claim 13 including:

a tubular member connecting the vacuum switch to the air intake manifold to subject to the vacuum switch to the vacuum pressure in the air intake manifold.

17. A speed control system for an internal combustion engine having an air intake manifold, igniters, fuel injectors and electronic controls for regulating the operations of the igniters and fuel injectors comprising:

a first switch for producing an electric first signal, a second switch operably connected to the air intake manifold of the engine for producing an electric second signal when the vacuum pressure in the intake manifold exceeds a predetermined vacuum pressure, a first electric conductor connecting the first switch to the second switch operably to electrically connect the first switch to the second switch to transfer the first signal to the second switch, a third normally closed switch operably electrically connected to the electronic controls of the engine and the igniter circuit whereby the electronic controls of the engine regulates the operation of the igniters, and a second electric conductor electrically connecting the second switch to the third switch to transfer the second signal to the third switch to actuate the third switch to an open position thereby opening the electric igniter circuit terminating electronic power to the igniters and shutting down the internal combustion engine.

18. The speed control system of claim 17 wherein:

the first switch is a manually operated switch.

19. The speed control system of claim 17 including:

a tubular member connecting the second switch to the air intake manifold to subject to the second switch to the vacuum pressure in the air intake manifold.

20. The speed control system of claim 17 including:

a third electric conductor connecting the third switch to one or more igniters whereby when the third switch is open the electric igniter circuit to the one or more igniters is open and the electric power to the one or more igniters is terminated.

21. The speed control system of claim 17 including:

a third electric conductor connecting the third switch to two of the igniters whereby when the third switch is open the electric igniter circuit to the two igniters is open and the electric power to the two igniters is terminated.

22. A speed control system for an internal combustion engine having an air intake manifold, igniters, fuel injectors and electronic controls for regulating the operations of the igniters and fuel injectors comprising:

a first switch for producing an electric first signal, a second switch operably connected to the air intake manifold of the engine for producing an electric second signal when the vacuum pressure in the intake manifold exceeds a predetermined vacuum pressure, a first electric conductor connecting the first switch to the second switch operably to electrically connect the first switch to the second switch to transfer the first signal to the second switch, a third normally closed switch operably electrically connected to the electronic controls of the engine and the fuel injector circuit whereby the electronic controls of the engine regulates the operation of the fuel injectors, and a second electric conductor electrically connecting the second switch to the third switch to transfer the second signal to the third switch to actuate the third switch to an open position thereby opening the electric fuel injector circuit terminating electronic power to the fuel injectors and shutting down the internal combustion engine.

23. The speed control system of claim 22 including:

a tubular member connecting the vacuum switch to the air intake manifold to subject to the vacuum switch to the vacuum pressure in the air intake manifold.

24. The speed control system of claim 22 including:

a third electric conductor connecting the relay to one or more igniters whereby when the fuel injectors is open the electric igniter circuit to the one or more fuel injectors is open and the electric power to the one or more fuel injectors is terminated.

25. The speed control system of claim 22 including:

a third electric conductor connecting the relay to two of the igniters whereby when the fuel injectors is open the electric igniter circuit to the two fuel injectors is open and the electric power to the two fuel injectors is terminated.

26. A speed control system for an internal combustion engine having an air intake manifold, igniters, a fuel pump, fuel injectors connected to the fuel pump and electronic controls for regulating the operations of the igniters, fuel pump and fuel injectors comprising:

a first switch for producing an electric first signal, second switch operably connected to the air intake manifold of the engine for producing an electric second signal when the vacuum pressure in the intake manifold exceeds a predetermined vacuum pressure, a first electric conductor connecting the first switch to the second switch operably to electrically connect the first switch to the second switch to transfer the first signal to the second switch, a third normally closed switch operably electrically connected to the electronic controls of the engine and the electric fuel pump circuit whereby the electronic controls of the engine regulates the operation of the fuel pump, and a second electric conductor electrically connecting the second switch to the third switch to transfer the second signal to the third switch to actuate the third switch to an open position thereby opening the electric fuel pump circuit terminating electronic power to the fuel pump and shutting down the internal combustion engine.

27. The speed control system of claim 26 including:

a tubular member connecting the second switch to the air intake manifold to subject to the second switch to the vacuum pressure in the air intake manifold.

28. A method of controlling unintended acceleration of a motor vehicle having an internal combustion engine with an air intake manifold, igniters, fuel injectors, electronic controls for regulating the operations of the igniters and fuel injectors and a brake pedal for applying the vehicle brakes characterized by:

producing an electric first signal responsive to depression of the brake pedal by the wheel's driver, producing an electric second signal responsive to vacuum pressure in the intake manifold exceeding a predetermined vacuum pressure, providing an electrical connection coupling the electronic controls to one or more igniters whereby the electronic controls regulates the operation of the one or more igniters, and interrupting the electrical connection with the first and second signals when the brake pedal is depressed and the vacuum pressure exceeds the predetermined vacuum pressure in the intake manifold thereby terminating electric power to the one or more igniters and reducing the power or shutting off the internal combustion engine allowing the vehicle driver to control the unintended acceleration of the motor vehicle.

29. The method of claim 28 including:

providing an electrical connection coupling the electronic controls to two igniters whereby the electronic controls regulate the operation of the two igniters and the remaining igniters of the engine, and interrupting the electrical connection to the two igniters with the first or second signals when the brake pedal is depressed and the vacuum pressure exceeds the predetermined vacuum pressure in the intake manifold thereby terminating electric power to the two igniters and reducing the power of the internal combustion engine.

30. A method of controlling unintended acceleration of a motor vehicle having an internal combustion engine with an air intake manifold, igniters, fuel injectors, electronic controls for regulating the operations of the igniters and fuel injectors and a brake pedal for applying the vehicle brakes characterized by:

producing an electric first signal responsive to depression of the brake pedal by the wheel's driver, producing an electric second signal responsive to vacuum pressure in the intake manifold exceeding a predetermined vacuum pressure, providing an electrical connection coupling the electronic controls to one or more fuel injectors whereby the electronic controls regulates the operation of the one or more fuel injectors, and interrupting the electrical connection with the first and second signals when the brake pedal is depressed and the vacuum pressure exceeds the predetermined vacuum pressure in the intake manifold thereby terminating electric power to the one or more fuel injectors and reducing the power or shutting off the internal combustion engine allowing the vehicle driver to control the unintended acceleration of the motor vehicle.

31. The method of claim 30 including:

providing an electrical connection coupling the electronic controls to two fuel injectors whereby the electronic controls regulate the operation of the two fuel injectors and the remaining fuel injectors of the engine, and interrupting the electrical connection to the two fuel injectors with the first or second signals when the brake pedal is depressed and the vacuum pressure exceeds the predetermined vacuum pressure in the intake manifold thereby terminating electric power to the two fuel injectors and reducing the power of the internal combustion engine.

32. A method of controlling unintended acceleration of a motor vehicle having an internal combustion engine with an air intake manifold, igniters, a fuel pump, fuel injectors connected to the fuel pump, electronic controls for regulating the operations of the igniters, fuel pump and fuel injectors and a brake pedal for applying the vehicle brakes characterized by:

producing an electric first signal responsive to depression of the brake pedal by the wheel's driver, producing an electric second signal responsive to vacuum pressure in the intake manifold exceeding a predetermined vacuum pressure, providing an electrical connection coupling the electronic controls to fuel pump whereby the electronic controls regulates the operation of the fuel pump, and interrupting the electrical connection with the first and second signals when the brake pedal is depressed and the vacuum pressure exceeds the predetermined vacuum pressure in the intake manifold thereby terminating electric power to the fuel pump and reducing the power or shutting off the internal combustion engine allowing the vehicle driver to control the unintended acceleration of the motor vehicle.

* * * * *